United States Patent
Adams

(10) Patent No.: US 7,842,898 B2
(45) Date of Patent: Nov. 30, 2010

(54) VARIABLE ORIFICE TORCH

(75) Inventor: Robbie J. Adams, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 304 days.

(21) Appl. No.: 11/947,293

(22) Filed: Nov. 29, 2007

(65) Prior Publication Data

US 2009/0223939 A1    Sep. 10, 2009

Related U.S. Application Data

(60) Provisional application No. 60/981,306, filed on Oct. 19, 2007.

(51) Int. Cl.
*B23K 10/00*    (2006.01)

(52) U.S. Cl. .............. 219/121.5; 219/121.47; 219/121.48; 315/111.21; 264/255

(58) Field of Classification Search ............ 219/121.5, 219/121.51, 121.48, 75, 76.16, 76.15, 121.59, 219/121.47; 315/111.21, 111.51; 264/104, 264/254, 255, 272.19; 60/228, 256, 771
See application file for complete search history.

(56) References Cited

U.S. PATENT DOCUMENTS

| | | | |
|---|---|---|---|
| 497,903 A | 5/1893 | Woodward | |
| 3,226,768 A | 1/1966 | von Zelewsky et al. | |
| 3,594,609 A * | 7/1971 | Vas | 315/111.41 |
| 3,618,925 A | 11/1971 | Giroiami | |
| 3,854,635 A | 12/1974 | Tschinkel | |
| 4,094,492 A | 6/1978 | Beeman et al. | |
| 4,911,805 A | 3/1990 | Ando et al. | |
| 5,105,732 A | 4/1992 | Sheu | |
| 5,110,047 A * | 5/1992 | Toews | 239/11 |
| 5,382,003 A | 1/1995 | Sankaranarayanan et al. | |
| 5,975,493 A | 11/1999 | Ellingson et al. | |
| 6,051,070 A | 4/2000 | Sunter | |
| 6,118,097 A | 9/2000 | Kaga et al. | |
| 6,200,508 B1 * | 3/2001 | Jacobson et al. | 264/104 |
| 6,325,096 B1 | 12/2001 | Rising et al. | |
| 6,399,927 B1 * | 6/2002 | Durr | 219/601 |

* cited by examiner

*Primary Examiner*—Mark H Paschall
(74) *Attorney, Agent, or Firm*—Ingrassia Fisher & Lorenz, P.C.

(57) ABSTRACT

A variable orifice torch for use in a solid free form fabrication system for manufacturing a component from successive layers of metal feedstock material. The variable orifice torch includes a torch structure defining a torch nozzle formed of a highly conductive bulk material. The variable orifice torch further includes a gas flow channel and a variable orifice defined therein. An arc electrode is disposed within the gas flow channel. The variable orifice is defined in the torch nozzle and in alignment with the arc electrode. The variable orifice is coupled to the torch structure in a manner operable to control a flow gas therethrough by varying the size of an aperture defined by the variable orifice.

20 Claims, 4 Drawing Sheets

VARIABLE ORIFICE TORCH

CROSS-REFERENCE TO RELATED APPLICATION

This application claims the benefit of U.S. Provisional Application No. 60/981,306 filed Oct. 19, 2007.

TECHNICAL FIELD

The present invention generally relates to the fabrication of parts and devices, and more particularly relates to a torch used in solid free-form fabrication processes that create parts and devices by selectively applying feedstock material to a substrate or an in-process workpiece.

BACKGROUND

Solid free-form fabrication (SFF) is a designation for a group of processes that produce three dimensional shapes from additive formation steps. Most SFF processes are also referred to as layer additive manufacturing processes. SFF does not implement any part-specific tooling. Instead, a three dimensional component is often produced from a graphical representation devised using computer-aided modeling (CAM). This computer representation may be, for example, a layer-by-layer slicing of the component shape into consecutive two dimensional layers, which can then be fed to control equipment to fabricate the part. Alternatively, the manufacturing process may be user controlled instead of computer controlled. Generally speaking, a component may be manufactured using SFF by successively building feedstock layers representing successive cross-sectional component slices. Although there are numerous SFF systems that use different components and feedstock materials to build a component, SFF systems can be broadly described as having an automated platform/positioner for receiving and supporting the feedstock layers during the manufacturing process, a feedstock supplying apparatus that directs the feedstock material to a predetermined region to build the feedstock layers, and an energy source directed toward the predetermined region by a torch. The energy from the energy source modifies the feedstock in a layer-by-layer fashion in the predetermined region to thereby manufacture the component as the successive layers are built onto each other.

One recent implementation of SFF is generally referred to as ion fusion formation (IFF). With IFF, a torch such as a plasma, gas tungsten arc, plasma arc welding, or other torch with an orifice is incorporated in conjunction with a stock feeding mechanism to direct molten feedstock to a targeted surface such as a base substrate or an in-process structure of previously-deposited feedstock. A component is built using IFF by applying small amounts of molten material only where needed in a plurality of deposition steps, resulting in net-shape or near-net-shape parts without the use of patterns, molds, or mandrels. The deposition steps are typically performed in a layer-by-layer fashion wherein slices are taken through a three dimensional electronic model by a computer program. Hence, in most deposition applications it would be considered a layer additive manufacturing process. A positioner then directs the molten feedstock across each layer at a prescribed thickness.

There are also several other SFF process that may be used to manufacture a component. SFF processes can be subdivided into subcategories such as direct metal deposition (DMD) and selective laser sintering (SLS) to name just a few. DMD is a process whereby metal is melted then placed where needed to build a three-dimensional part. SLS on the other hand spreads a layer of powder on a table then selectively fuses the appropriate portion to build a three-dimensional component. One of the challenges facing SFF processes, and more particularly ion fusion formation (IFF) processes and direct metal deposition (DMD) processes is that of achieving a high deposition accuracy rate, so as to approach a net shape more closely and thereby reduce or eliminate the need for subsequent machining. As machining is reduced, the cost of the component is reduced. However, to be economically viable the deposition rates are preferably high relative to the thickness of the section to be built.

In order to achieve higher deposition accuracy rates, high heat is required. This applies to all IFF and DMD systems but particularly to gaseous systems, such as arc based systems. These types of gaseous systems inherently tend to be more energy diffuse than laser or electron beam systems due to the basic mechanism of heat transfer, and more particularly the impingement of very high temperature gas flow onto a work piece. One inherent limitation of this type of system is the torch gas concentration and the velocity of the gas through an orifice of the torch. To vary the heat flow in a gaseous system one of the variables is the size of the orifice. A large orifice supplies more heat and a smaller orifice less heat, but with greater accuracy. When the orifice size is decreased, the velocity increases, if all other variables remain constant. Gas velocity above a certain level creates splatter. In addition, a small orifice size restricts heat flow due to the gas flow restriction. Consequently, the deposition rate is reduced.

Compounding the issue of high deposition accuracy rates are variations in the thickness of the walls of the component being fabricated. Many components require deposition of areas of high thickness relative to other areas of lesser thickness. Variation of the deposition rate for a gaseous torch from a high rate to a low rate requires variation of the orifice size to match heat transfer to material feed rate. As stated earlier, a higher rate of deposition requires a higher feed rate and more heat. This results in a need for greater gas flow and thus a larger orifice to stay below the velocity that creates spatter.

In addition to SFF, joining of two components using conventional plasma torches nozzles creates relatively large fusion zones compared to other fusion joining processes such as electron beam or laser welding. A narrower orifice could reduce the fusion zone width (diameter) of the plasma weld and possibly increase penetration of the weld. The latter would result from a higher energy density at the plasma spot in the joint.

Current technology requires the orifice for IFF to be changed manually. This is cumbersome as the deposition operation must be stopped, the electric arc turned off and the torch allowed to cool. Additionally, this is very time consuming and inefficient. A preferred approach would be to change the orifice size continuously during operation. Currently, a typical IFF or DMD system has the capacity to change orifice size by removing one orifice and installing another of different size. Ideally a change in the orifice size, and more particularly the diameter of the orifice, would be accomplished without physically replacing the orifice as occurs now. Thus, as a part is built the nozzle would change diameter depending on how much heat was required to build a given feature. As more heat is needed to achieve higher deposition rates the orifice diameter would be enlarged. For more accurate depositions, the orifice diameter would be reduced to reduce the heat spot size, perhaps the heat flow, and melt size of the feedstock.

Hence, there is a need for a torch nozzle for use in high deposition rate accuracy applications, such as in solid free-form applications, that includes a torch nozzle, including an orifice that provides for variations in delivery of heat depending on how much heat is required to build a given component feature.

BRIEF SUMMARY

The invention described in this disclosure supports the creation of a torch, and more particularly a torch nozzle including an improved orifice of the torch nozzle that provides for variations in the delivery of heat for use in solid free-form fabrication (SFF) systems, such as direct metal deposition (DMD) systems. This is accomplished by incorporating moveable components that would change the orifice size.

In one particular embodiment, and by way of example only, provided is a variable orifice torch for use in a solid free form fabrication system for manufacturing a component from successive layers of metal feedstock material. The variable orifice torch includes a torch structure, an arc electrode, and a variable orifice defined in the torch nozzle. The torch structure includes a torch nozzle comprised of a bulk material and having a gas flow channel defined therein. The arc electrode is disposed within the gas flow channel formed in the torch nozzle. The variable orifice is in alignment with the arc electrode. The variable orifice is coupled to the torch structure and operable to control a flow gas therethrough.

In another embodiment, and by way of example only, there is provided a variable orifice torch including a torch structure, an arc electrode, and a variable orifice comprised of a plurality of partial disc members. The torch structure includes a torch nozzle comprised of a bulk material and having a gas flow channel defined therein. The arc electrode is disposed within the gas flow channel formed in the torch nozzle. The variable orifice is coupled to the torch nozzle and operable to control a flow gas therethrough.

In another embodiment, and by way of example only, there is provided a solid free form fabrication system for manufacturing a component from successive layers of a metal feedstock material. The system including a variable orifice torch positioned to emit an energy stream in an energy path, a feedstock feed mechanism, a positioning arm, and a control platform. The feedstock feed mechanism is operable to feed the metal feedstock material into the energy path and deposit the metal feedstock material into a predetermined region to form the successive layers of the metal feedstock material. The positioning arm is coupled to the energy stream and the feedstock feed mechanism to form a deposition head. The positioning arm is positionable to align the deposition head with a targeted region to fabricate a three-dimensional structure by transferring the metal feedstock material from the feedstock feed mechanism to the targeted region in a controlled manner by melting the metal feedstock material at a deposition point and allowing it to re-solidify at the targeted region. The control platform is coupled to the positioning arm and includes a plurality of control components, whereby a plurality of customizable control parameters are input into the plurality of control components and provide positioning and repositioning of the positioning arm and operation of the deposition head. The variable orifice torch includes a torch structure, an arc electrode, and a variable orifice. The torch structure includes a torch nozzle comprised of a bulk material and having a gas flow channel and an orifice defined therein. The arc electrode is disposed within the gas flow channel formed in the torch nozzle. The variable orifice is defined in the torch nozzle and comprised of a plurality of partial disc members. The variable orifice is coupled to the torch structure and operable to control a flow gas therethrough.

DETAILED DESCRIPTION OF A PREFERRED EMBODIMENT

The following description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
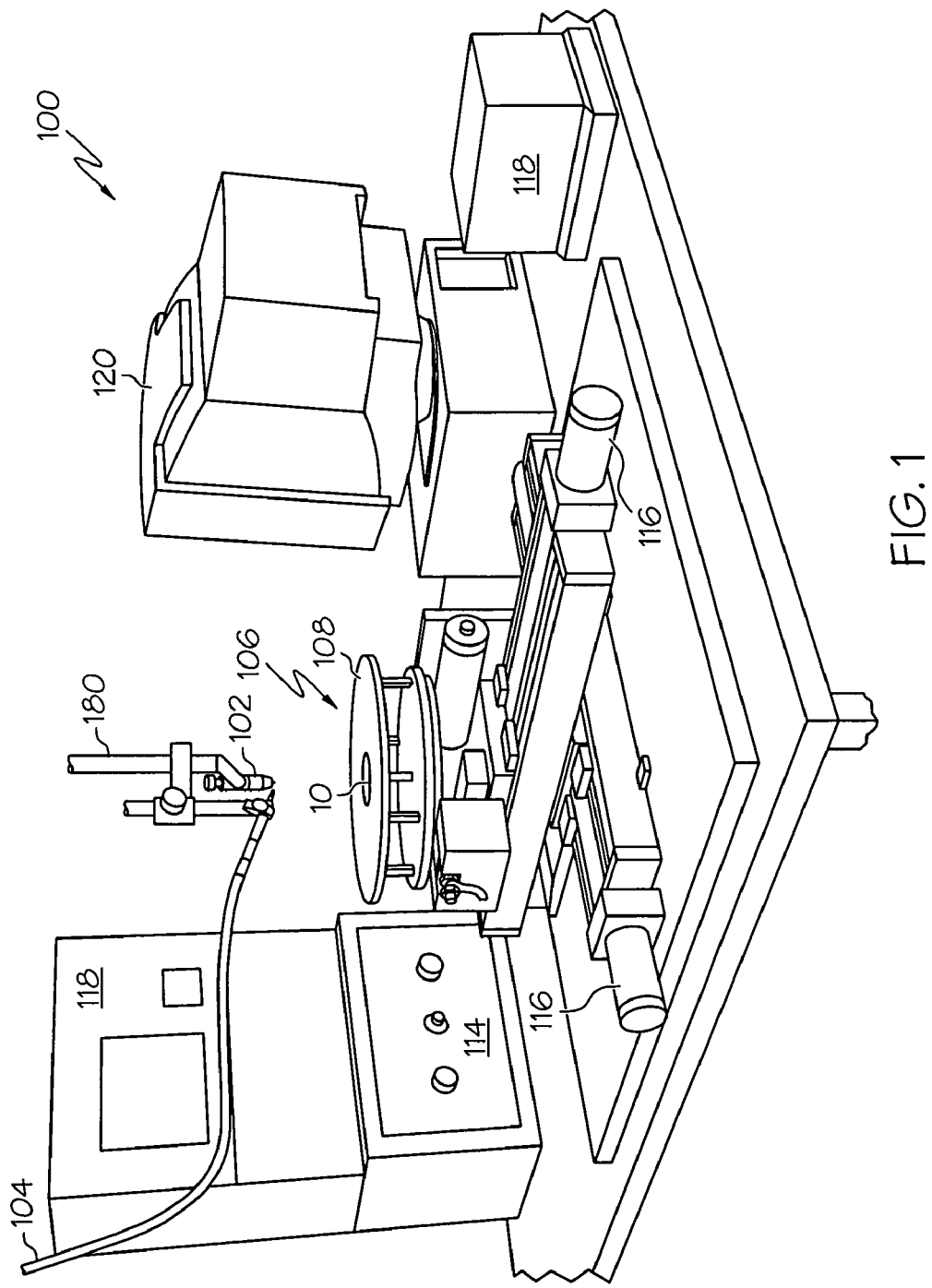
FIG. 1 is a perspective view of an IFF system according to an embodiment of the invention.

Disclosed is an IFF system including a torch, having a torch nozzle, and more particularly an orifice of a torch nozzle that is capable of varying the diameter or size of the orifice in relation to heat demand. Referring to the illustrations, FIG. 1 is a perspective view of an IFF system 100, which includes a variable orifice torch 102 that functions in cooperation with a wire feed mechanism 104 and a positioning system 106 to build up a workpiece in a continuous or layer-by-layer manner. The positioning system 106 continuously positions and repositions a platform 108, and more particularly a workpiece 110 built upon the platform 108 in a manner whereby feedstock material may be added to the workpiece 110 through the wire feed mechanism 104 at predetermined deposition points. Further, the positioning system 106 may also be configured to coordinate movement and control of the variable orifice torch 102 and the wire feed mechanism 104 together with the workpiece 110 to fabricate three-dimensional articles in a predictable, highly selectable, and useful manner. Control of the positioning system 106 may be achieved by computer-implemented control software or the like. The coordinated variable orifice torch 102, the wire feed mechanism 104, and the positioning system 106 provide a highly flexible, manually adaptable, and spontaneously constructible automated system through which components may be fabricated to net or near-net shape.

Additional elements depicted in FIG. 1 include a gas controller 112 that controls gas and/or fluid flow to the variable orifice torch 102, which is preferably a plasma welding torch. A plasma or arc power source 114 supplies the necessary power to the variable orifice torch 102. Positioners and/or positioning motors 116 are supplied with positioning signals from an electric drive 118 that is coupled to a computer 120 or other controlling device.

Figure 2:
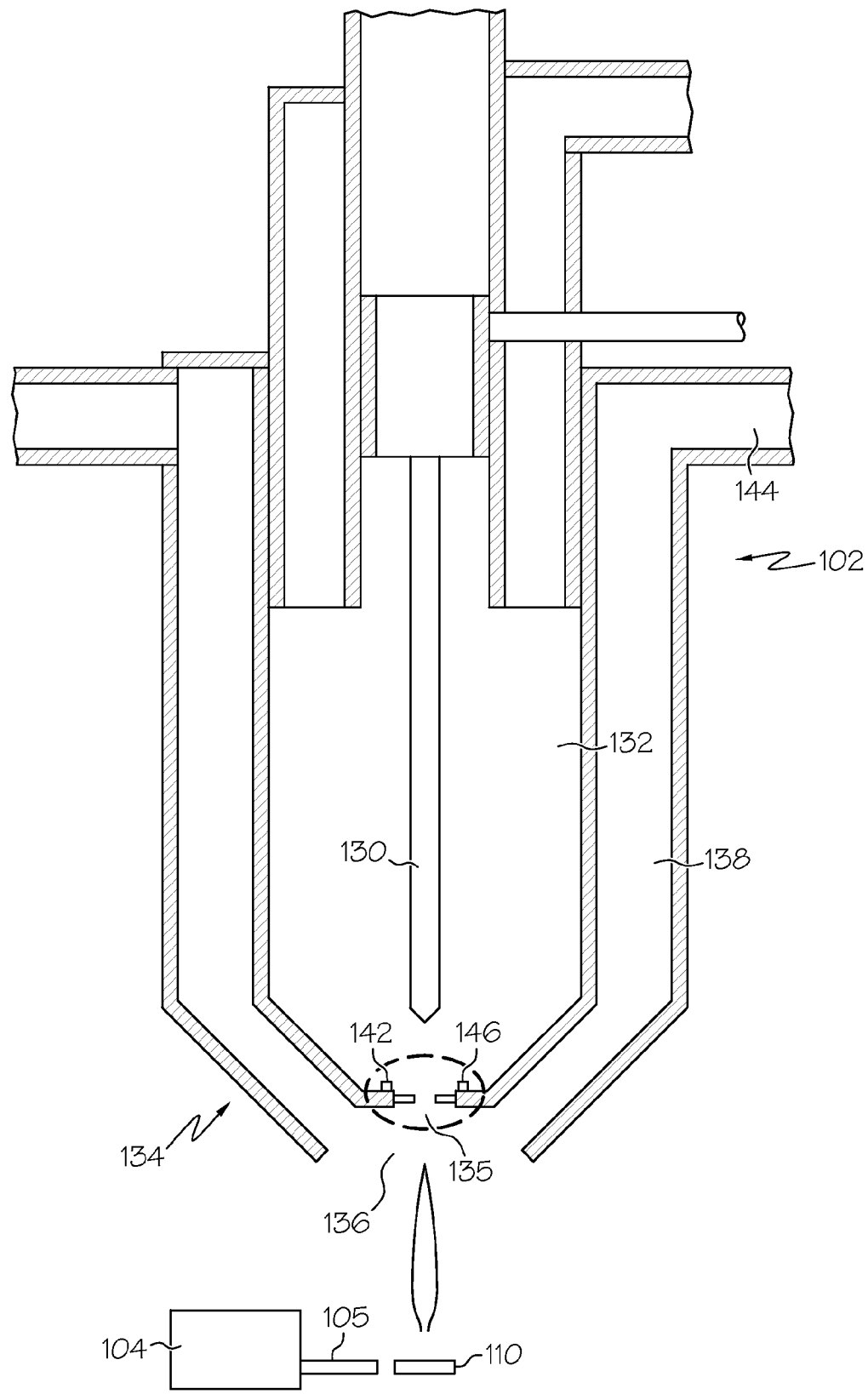
FIG. 2 is a cross-sectional view of a variable orifice torch from an IFF system, the variable orifice torch functioning in cooperation with a wire feed mechanism, which is depicted in a perspective view.

A cross-sectional view of the variable orifice torch 102 is depicted in detail in FIG. 2, illustrating an embodiment of the variable orifice torch 102 in cooperation with a wire feed mechanism 104. Referring more specifically to FIG. 2, the variable orifice torch 102 includes a torch nozzle 134 formed at a proximate end and having a variable orifice 135 formed therein the torch nozzle 134. An arc electrode 130 is positioned near the torch nozzle 134 and inside a gas flow channel 132. The arc electrode 130 operates to ionize a gas and create a hot argon plasma in region 136 before the gas exits the torch nozzle 134. Upon being energized, the argon gas rapidly accelerates from the torch nozzle 134 toward the workpiece 110 via the variable orifice 135. The wire feed mechanism 104 introduces a feedstock 105 between the torch nozzle 134 and the workpiece 110. In an exemplary embodiment, the workpiece 110 is included in an electrical circuit including the ionized gas in order to accelerate and attract the ions from the torch nozzle 134. The workpiece may be charged by applying a voltage that is opposite of the charge generally present in the ionized plasma gas. The ionized gas is then electrically attracted to the workpiece 110. Use of such electrical charge in the workpiece 110 may also serve to control the direction and distribution of the ionized plasma gas. The degree of attraction between the ions and the workpiece 110 may be controlled by increasing or decreasing the charge present on the workpiece 110.

A noble gas such as argon is preferably ionized using the arc electrode 130, although alternative inert gases, ions, molecules, or atoms may be used in conjunction with the variable orifice torch 102 instead of argon. These alternative mediators of the plasma energy may include positive and/or negative ions or electrons alone or together with ions. Further, reactive elements may be combined with an inert gas such as argon to optimize performance of the variable orifice torch 102. The plasma generating process energizes the argon gas so that the gas temperature is raised to between 5,000 and 30,000 K. Consequently, only a small volume of energized argon gas is required to melt feedstock 105 from the wire feed mechanism 104.

The ionized argon plasma, and all other ionized noble gases, have strong affinity for electrons and will obtain them from the surrounding atmosphere unless the atmosphere consists of gases having equal or higher electron affinity. One advantage of the exemplary IFF system depicted in the drawings does not require a pressurization chamber or other chamber in which the ambient gas is controlled. However, to prevent the ionized argon plasma from obtaining electrons and/or ions from the surrounding atmosphere, i.e. from nitrogen and oxygen typically present in ambient environments, the ionized argon plasma may be sheathed or protected by a curtain of helium, another noble gas, or other inert gases flowing from the torch nozzle 134 from a coaxial channel 138. Helium and other noble gases hold their electrons with a high degree of affinity, and are less susceptible than oxygen or nitrogen to having its electrons taken by the ionized argon plasma. In the depicted embodiment, a gas flow line 144 leads into the coaxial channel 138.

Any material susceptible to melting by an argon ion or other plasma beam may be supplied using a powder feed mechanism or the wire feed mechanism 104 as the metal feedstock 105. Such materials may include steel alloys, aluminum alloys, titanium alloys, nickel alloys, although numerous other materials may be used as the metal feedstock 105 depending on the desired material characteristics such as fatigue initiation, crack propagation, post-welding toughness and strength, and corrosion resistance at both welding temperatures and those temperatures at which the component will be used. Specific operating parameters including plasma temperatures, build materials, melt pool parameters, nozzle angles and tip configurations, inert shielding gases, dopants, and nozzle coolants may be tailored to fit an IFF process. U.S. Pat. No. 6,680,456 discloses an IFF system and various operating parameters, and is hereby incorporated herein by reference.

As previously stated gaseous systems, such as the IFF system 100, is inherently energy diffuse due to the basic mechanism of heat transfer, and more particularly the impingement of very high temperature gas flow onto the work piece 110. During operation, the velocity of the gas through the torch nozzle 134, and more particularly the variable orifice 135 of the torch nozzle 134 provides for an increase or decrease of the heat generated.

Figure 3:
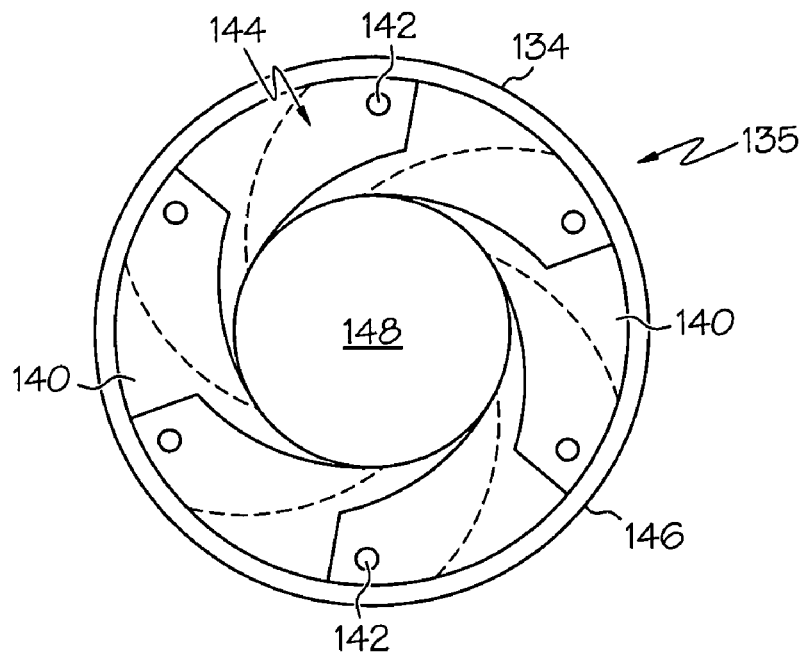
FIG. 3 is a plan view of an embodiment of a variable orifice torch from an IFF system, the variable orifice torch illustrated in a substantially open position.
Figure 4:
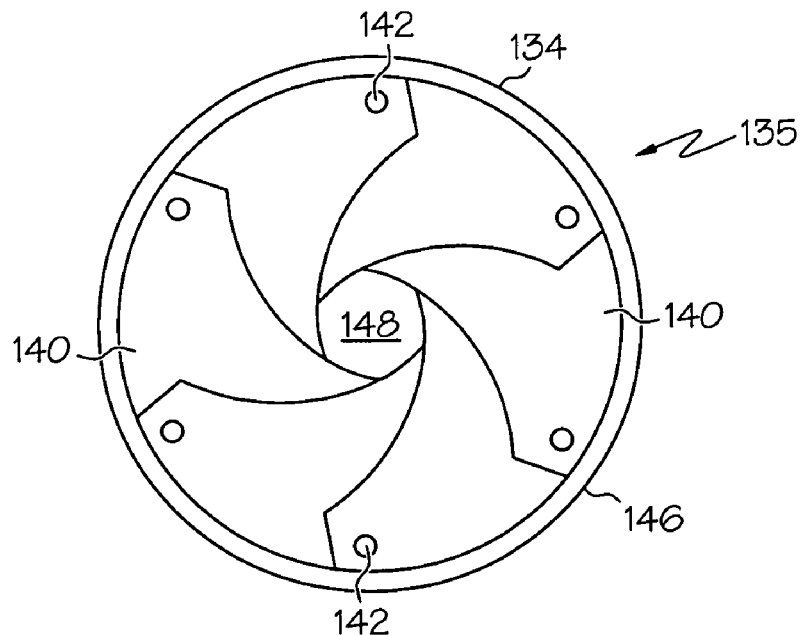
FIG. 4 is a plan view of an embodiment of a variable orifice torch from an IFF system, the variable orifice torch illustrated in a position having a substantially smaller orifice opening than the embodiment illustrated in FIG. 3.

To deliver variations in heat, the variable orifice 135 of the torch nozzle 134 is fabricated to provide for variations in the diameter or size of the variable orifice 135 in relation to heat demand without a need to disassembly the torch 102. Referring now to FIGS. 3 and 4, illustrated in plan views is the variable orifice 135 of FIG. 1 illustrated in a substantially open position and in a position having a substantially smaller orifice opening. The variable orifice 134 is generally comprised of a plurality of curved partial disc members 140 positioned about a central aspect of the nozzle 134. Each of the plurality of partial disc members 140 is shaped like a crescent and may include a rod 142 attached to a periphery 144 of each of the partial disc members 140. Each of the rods 142 is coupled to a nozzle wall 146 of the torch nozzle 134. In an alternative embodiment, each of the rods 142 may be coupled to the interior component of the torch nozzle 134 rather than the nozzle wall 146.

Figure 5:
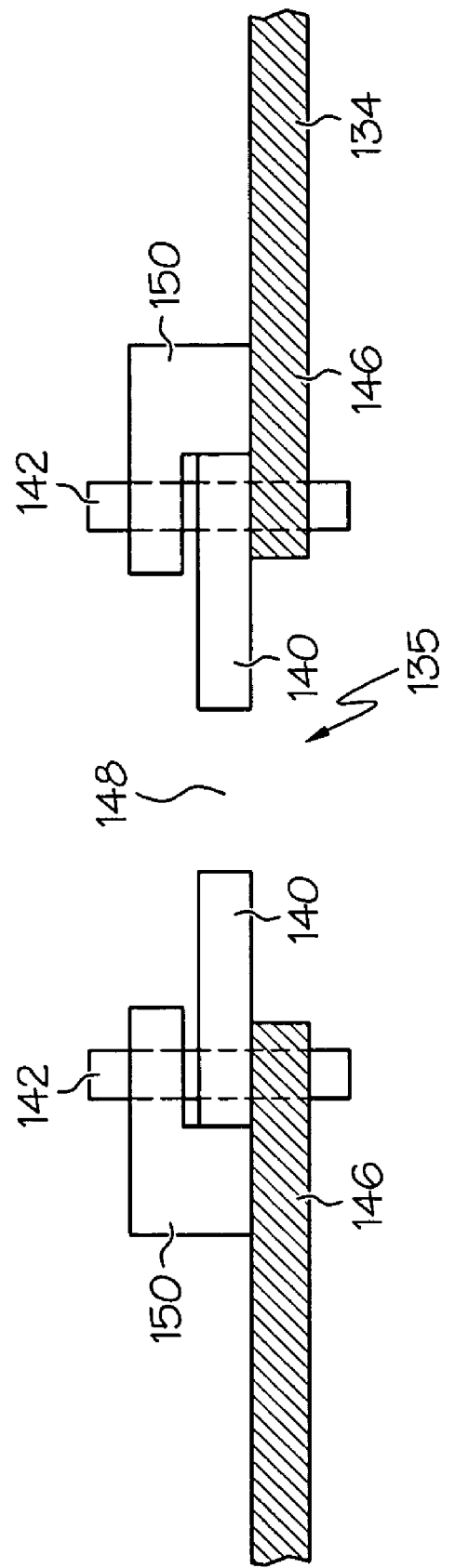
FIG. 5 is a partial cross section view of the variable orifice torch depicted in FIGS. 3 and 4.

During operation of the variable orifice 134, each of the rods 142 is caused to rotate, thereby causing each of the partial disc members 140 to also rotate with respect to the nozzle wall 146. More specifically, each of the plurality of partial disc members 140 pivots about the rod 142 located at its periphery 144. This rotational movement of the plurality of partial disc members 140 results in a change in the size/diameter of an aperture 148 defined in the variable orifice 135. As best illustrated in FIG. 3, the aperture 148 diameter is enlarged as the plurality of partial disc members 140 rotate outward relative to the nozzle wall 146. Conversely, the aperture 148 diameter is decreased as the partial disc members 140 rotate inward relative to the nozzle wall 146. By positioning the rod 142 of each of the partial disc members 140 within the structure that defines the torch nozzle 134, the nozzle 134 components are more easily cooled. Multiple approaches could be facilitated to rotate the disc rods 142. For example, as best illustrated in FIG. 5 in a partial sectional view, one approach would be to couple a rotating disc ring 150 to each of the rods 142. The rotating disc ring 150 forms a ring around all the partial disc members 140. During operation, when the rotating disc ring 150 rotates about an axis of the variable orifice torch 102, each of the plurality of partial disc members 140 would rotate, thereby varying the size of the aperture 148. Alternatively, a portion of each of the plurality of disc members 140 may be coupled directly to the rotating disc ring 150 without the inclusion of the rods 142.

In addition, erosion of the variable orifice torch 102 and more particularly the variable orifice 135 may be of concern when high heat is utilized during fabrication of the component 110. Erosion of the variable orifice 135 and the structure defining the torch nozzle 134 may be minimized by fabricating the variable orifice 135 and the torch nozzle 134 of a highly conductive bulk material, such as those tungsten, carbon, rhenium, copper, ceramics, iridium, etc., that is coated with an erosion resistant material as described in copending application Ser. No. 11,947,252 entitled "Erosion Resistant Orifice Torch", filed simultaneously herewith. This combination of materials may provide not only high bulk thermal conductivity but a more resistant erosion surface at a nozzle-gas interface.

Described is a torch, including a torch nozzle and more particularly a variable orifice of a torch nozzle, for use in SFF systems that is capable of varying the diameter or size of an aperture defined by the variable orifice 135 in relation to heat demand. The variable orifice 135 is comprised of a plurality of curved partial disc members 140 positioned about a central aspect of the torch nozzle 134.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention.

I claim:

1. A variable orifice torch for use in a solid free form fabrication system for manufacturing a component from successive layers of metal feedstock material, the variable orifice torch comprising:
   a torch structure including a torch nozzle comprised of a bulk material and having a gas flow channel and a coaxial channel defined therein, at least a portion of the coaxial channel surrounding the gas flow channel;
   an arc electrode disposed in the torch nozzle and within the gas flow channel formed in the torch nozzle; and
   a variable orifice disposed within the torch nozzle and in alignment with the arc electrode, the variable orifice coupled to the torch structure and operable to control a flow of gas therethrough from the gas flow channel.

2. The variable orifice torch of claim 1, wherein the solid free form fabrication system is an ion fusion formation system.

3. The variable orifice torch of claim 1, wherein the bulk material is at least one of tungsten, carbon, rhenium, copper, iridium, a refractory material, an alloy of a refractory material including tungsten, carbon, rhenium, copper, iridium, or a ceramic material.

4. The variable orifice torch of claim 1, wherein the variable orifice is comprised of a plurality of partial disc members.

5. The variable orifice torch of claim 4, wherein each of the plurality of partial disc members is crescent shaped.

6. The variable orifice torch of claim 4, further including a plurality of rods, each of the plurality of partial disc members rotationally coupled to a rod at a periphery of each partial disc member.

7. The variable orifice torch of claim 6, wherein the plurality of rods are further coupled to a rotating disc ring.

8. The variable orifice torch of claim 4, wherein the variable orifice defines an aperture for a flow of gas therethrough from the gas flow channel, the aperture being variable in size depending upon the positioning of the plurality of disc members.

9. The variable orifice torch of claim 4, wherein the plurality of partial disc members are moveably coupled to a wall of the torch nozzle.

10. A variable orifice torch for use in an ion fusion fabrication system for manufacturing a component from successive layers of metal feedstock material, the variable orifice torch comprising:
    a torch structure including a torch nozzle comprised of a bulk material and having a gas flow channel and a coaxial channel defined therein, at least a portion of the coaxial channel surrounding the gas flow channel;
    an arc electrode disposed in the torch nozzle and within the gas flow channel formed in the torch nozzle; and
    a variable orifice disposed within the torch nozzle and in alignment with the arc electrode, the variable orifice comprised of a plurality of partial disc members, the variable orifice coupled to the torch nozzle and operable to control a flow of gas therethrough from the gas flow channel.

11. The variable orifice torch of claim 10, wherein each of the plurality of partial disc members is crescent shaped.

12. The variable orifice torch of claim 10, further including a plurality of rods, each of the plurality of partial disc members rotationally coupled to a rod at a periphery of each partial disc member.

13. The variable orifice torch of claim 12, wherein the plurality of rods are further coupled to a rotating disc ring.

14. The variable orifice torch of claim 10, wherein the variable orifice defines an aperture for a flow of gas therethrough from the gas flow channel, the aperture being variable in size depending upon the positioning of the plurality of disc members.

15. The variable orifice torch of claim 10, wherein the plurality of partial disc members are moveably coupled to a wall of the torch nozzle.

16. A solid free form fabrication system for manufacturing a component from successive layers of a metal feedstock material, the system comprising:
    a variable orifice torch positioned to emit an energy stream in an energy path;
    a feedstock feed mechanism operable to feed the metal feedstock material into the energy path and deposit the metal feedstock material into a predetermined region to form the successive layers of the metal feedstock material;
    a positioning arm coupled to the energy stream and the feedstock feed mechanism to form a deposition head, whereby the positioning arm is positionable to align the deposition head with a targeted region to fabricate a three-dimensional structure by transferring the metal feedstock material from the feedstock feed mechanism to the targeted region in a controlled manner by melting the metal feedstock material at a deposition point and allowing it to re-solidify at the targeted region; and
    a control platform coupled to the positioning arm, the control platform including a plurality of control components, whereby a plurality of customizable control parameters are input into the plurality of control components and provide positioning and repositioning of the positioning arm and operation of the deposition head;
    wherein the variable orifice torch comprises:
        a torch structure including a torch nozzle comprised of a bulk material and having a gas flow channel and a coaxial channel defined therein, at least a portion of the coaxial channel surrounding the gas flow channel;
        an arc electrode disposed within the gas flow channel; and
        a variable orifice disposed within the torch nozzle and comprised of a plurality of partial disc members, the variable orifice coupled to the torch structure and operable to control a flow of gas therethrough from the gas flow channel.

17. The variable orifice torch of claim 16, further including a plurality of rods, each of the plurality of partial disc members rotationally coupled to a rod at a periphery of each partial disc member.

18. The variable orifice torch of claim 17, wherein the plurality of rods are further coupled to a rotating disc ring.

19. The variable orifice torch of claim 16, wherein the variable orifice defines an aperture for a flow of gas therethrough from the gas flow channel, the aperture being variable in size depending upon the positioning of the plurality of disc members.

20. The variable orifice torch of claim 16, wherein the plurality of partial disc members are moveably coupled to a wall of the torch nozzle.

* * * * *